US012340049B2

(12) United States Patent
Guo et al.

(10) Patent No.: US 12,340,049 B2
(45) Date of Patent: Jun. 24, 2025

(54) TOUCH DISPLAY PANEL AND MANUFACTURING METHOD THEREFOR

(71) Applicants: AUO (KUNSHAN) CO., LTD., Kunshan (CN); AUO Corporation, Hsin-Chu (TW)

(72) Inventors: Xingyun Guo, Kunshan (CN); Wei-Che Sun, Hsin-Chu (TW); Qiang Li, Kunshan (CN); Yu-Ching Liu, Hsin-Chu (TW)

(73) Assignees: AUO (KUNSHAN) CO., LTD., Kunshan (CN); AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/514,177

(22) Filed: Nov. 20, 2023

(65) Prior Publication Data

US 2025/0103164 A1 Mar. 27, 2025

(30) Foreign Application Priority Data

Sep. 26, 2023 (CN) ......................... 202311253334.5

(51) Int. Cl.
*G06F 3/041* (2006.01)

(52) U.S. Cl.
CPC .......... *G06F 3/0418* (2013.01); *G06F 3/0412* (2013.01); *G06F 3/04164* (2019.05); *G06F 2203/04103* (2013.01)

(58) Field of Classification Search
CPC . G06F 2203/04103; G06F 3/044–0448; G06F 3/0412–04186
See application file for complete search history.

(56) References Cited

U.S. PATENT DOCUMENTS

| | | | | |
|---|---|---|---|---|
| 11,385,513 | B2 | 7/2022 | Nakagawa | |
| 2019/0203336 | A1 | 7/2019 | Xu | |
| 2019/0258343 | A1* | 8/2019 | Hwang | G06F 3/0445 |
| 2021/0048743 | A1 | 2/2021 | Yin | |
| 2021/0357079 | A1* | 11/2021 | Song | G06F 3/0412 |
| 2023/0127411 | A1* | 4/2023 | Liu | H10K 59/873 345/174 |

FOREIGN PATENT DOCUMENTS

| | | |
|---|---|---|
| CN | 108828859 B | 4/2021 |
| CN | 116149507 A | 5/2023 |

* cited by examiner

*Primary Examiner* — Hang Lin
(74) *Attorney, Agent, or Firm* — WPAT, PC

(57) ABSTRACT

The invention provides a touch display panel and a manufacturing method therefor. The touch display panel comprises a substrate; a display region disposed on the substrate; a first touch electrode disposed in the display region; a second touch electrode disposed in the display region; and a third touch electrode disposed in the display region, the first touch electrode, the second touch electrode and the third touch electrode arranged adjacently, and the third touch electrode and the second touch electrode electrically disconnected; wherein the second touch electrode is electrically connected to the first touch electrode, and an area of the third touch electrode is greater than an area of the first touch electrode and/or an area of the second touch electrode.

16 Claims, 3 Drawing Sheets

100
Q2
105
101
D2
D1
Q1
AA Q1 Q2
BA
200

TOUCH DISPLAY PANEL AND MANUFACTURING METHOD THEREFOR

BACKGROUND OF THE INVENTION

1. Field of the Invention

The invention relates to a touch display panel and a manufacturing method therefor, and particularly to a touch display panel and a manufacturing method therefor that can improve display quality and avoid touch abnormality.

2. Related Art

With development of science and technology, display devices are widely applied to many electronic products, such as, cellular phones, tablet computers, watches, vehicles, and so on.

As for the same series of display devices, sizes and resolutions are the same, and the difference is often only in difference of sizes of opening (flowing sea), such as, IPHONE12 and IPHONE13. When manufacturing the same series of display devices with different openings, different mask plates shall be developed correspondingly, causing an increase of cost. If a part of the mask plates is shared, for example, sharing the mask plates for forming the touch electrodes, in the display device with a small opening, large area touch electrodes are produced on both sides of the opening, and areas of the touch electrodes exceed the maximum design area, and cannot be effectively controlled, such that the touch display panel has the problems of touch abnormality and insufficient charging of the electrodes when operating at a high frequency. Moreover, a part of touch display panel also causes the problems of potential shift, and difference of brightness of the display image due to difference of areas of the touch electrodes.

Therefore, how to provide a touch display panel and a manufacturing method therefor that can improve display quality and avoid touch abnormality is actually one of the problems to be solved.

SUMMARY OF THE INVENTION

The embodiments of the invention provide a touch display panel and a manufacturing method therefor that can improve display quality and avoid occurrence of problem of touch abnormality.

The touch display panel in one embodiment of the invention comprises a substrate; a display region disposed on the substrate; a first touch electrode disposed in the display region; a second touch electrode disposed in the display region; and a third touch electrode disposed in the display region, the first touch electrode, the second touch electrode and the third touch electrode arranged adjacently, and the third touch electrode and the second touch electrode electrically disconnected; wherein the second touch electrode is electrically connected to the first touch electrode, and an area of the third touch electrode is greater than an area of the first touch electrode and/or an area of the second touch electrode.

In the touch display panel, the first touch electrode has a first area S1, and the second touch electrode has a second area S2, where $Smin \leq (S1+S2) \leq Smax$, Smin is the minimum design area of each of the touch electrodes, and Smax is the maximum design area of each of the touch electrodes.

In the touch display panel, the second touch electrode further comprises a plurality of electrode units electrically connected to the first touch electrode, respectively.

In the touch display panel, the first area S1 is less than Smin, or the second area S2 is less than Smin.

In the touch display panel, the third touch electrode has a third area S3, where $Smin \leq S3 \leq Smax$.

In the touch display panel, the display region comprises a regular shape region and an irregular shape region, and the first touch electrode, the second touch electrode and the third touch electrode are located in the irregular shape region.

In the touch display panel, the irregular shape region is located at a corner of the display region, or the touch display panel further comprises an opening region adjacent to the irregular shape region.

In the touch display panel, an overall shape formed by the first touch electrode, the second touch electrode and the third touch electrode is an irregular shape.

In the touch display panel, at least one of the first touch electrode, the second touch electrode and the third touch electrode has an irregular shape.

In the touch display panel, the display panel further comprises: a first signal line and a second signal line disposed on the substrate; and a first insulating layer disposed on the substrate and covering the first signal line and the second signal line, the first touch electrode, the second touch electrode and the third touch electrode disposed on the first insulating layer, the first touch electrode electrically connected to the first signal line, and the third touch electrode electrically connected to the second signal line.

In the touch display panel, the display panel further comprises: a second insulating layer disposed on the second touch electrode; and a pixel electrode layer disposed on the second insulating layer; wherein corresponding to the second touch electrode, the first insulating layer and the second insulating layer are provided with a first opening exposing a part of the first signal line, and the pixel electrode layer extends to the first opening and is electrically connected to the first signal line.

In the touch display panel, corresponding to the second touch electrode, the second insulating layer is provided with a second opening exposing a part of the second touch electrode, and the pixel electrode layer extends to the second opening and is electrically connected to the second touch electrode.

In the touch display panel, the display panel further comprises: a second insulating layer disposed on the second touch electrode; and a pixel electrode layer disposed on the second insulating layer; wherein corresponding to the first touch electrode and the second touch electrode, the second insulating layer is provided with an opening exposing a part of the first touch electrode and a part of the second touch electrode, and the pixel electrode layer extends to the opening and is electrically connected to the first touch electrode and the second touch electrode.

In the touch display panel, the third touch electrode is a single electrode unit, or the third touch electrode comprises a plurality of electrode units electrically connected to each other.

A method for manufacturing a display panel in one embodiment of the invention comprises: providing a substrate having a display region; and forming a first touch electrode, a second touch electrode and a third touch electrode in the display region, the first touch electrode, the second touch electrode and the third touch electrode arranged adjacently; wherein the third touch electrode and the second touch electrode are electrically disconnected, the first touch electrode is electrically connected to the second touch electrode, and an area of the third touch electrode is greater than an area of the second touch electrode.

In the method, the method further comprises: the second touch electrode comprising a plurality of electrode units electrically connected to the first touch electrode, respectively.

In the method, the first touch electrode has a first area S1, and the second touch electrode has a second area S2, where Smin≤(S1+S2)≤Smax, Smin is the minimum design area of each of the touch electrodes, and Smax is the maximum design area of each of the touch electrodes.

In the method, the first area S1 is less than Smin, or the second area S2 is less than Smin.

Hereinafter the invention is described in details combining with the accompanying drawings and the specific embodiments, but the invention is not limited thereto.

DETAILED EMBODIMENTS OF THE INVENTION

Figure 1:
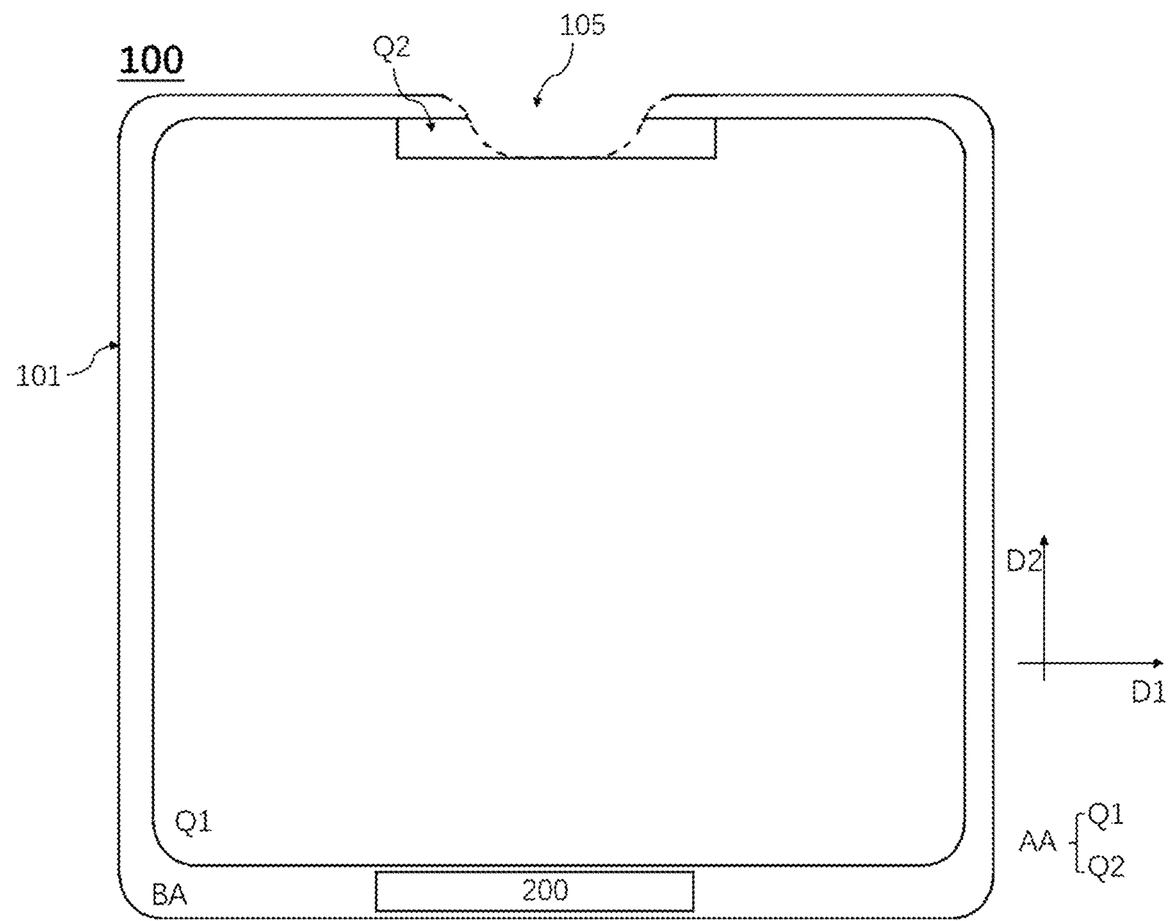
FIG. 1 is a structural diagram of a touch display panel in one embodiment of the invention.
Figure 2:
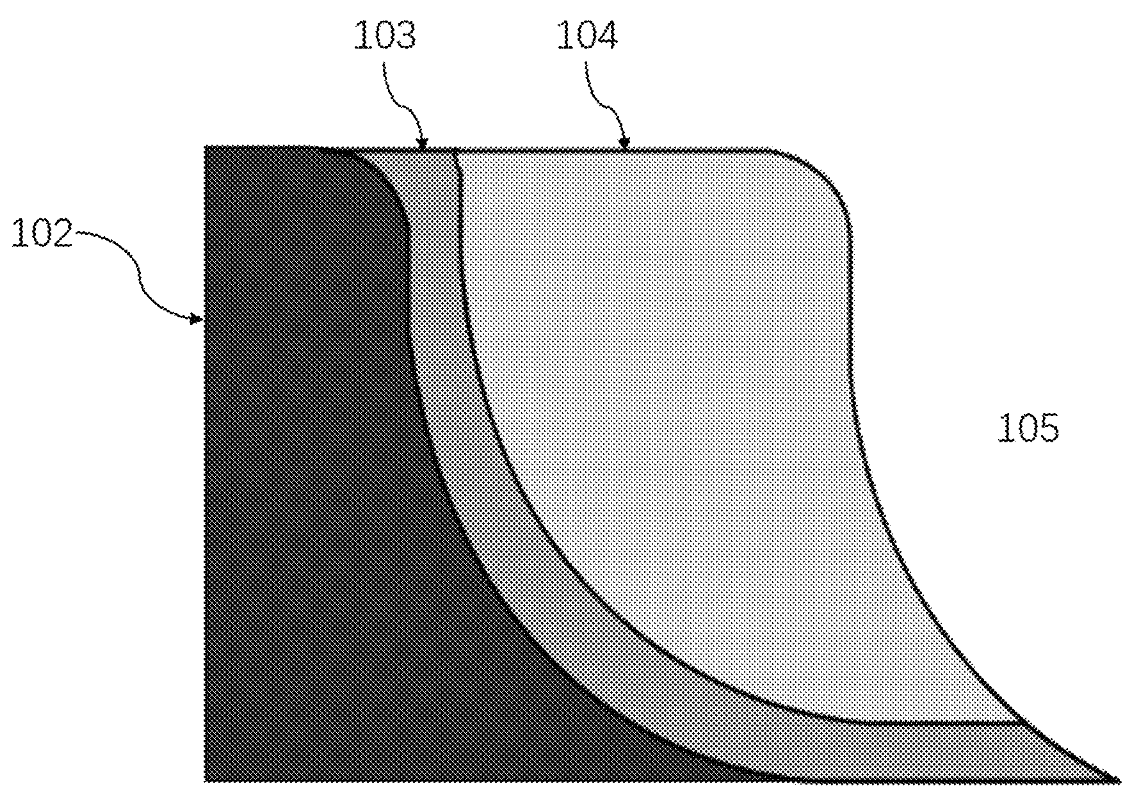
FIG. 2 is an enlarged diagram of a part of region Q2 in the touch display panel in one embodiment of the invention.
Figure 3:
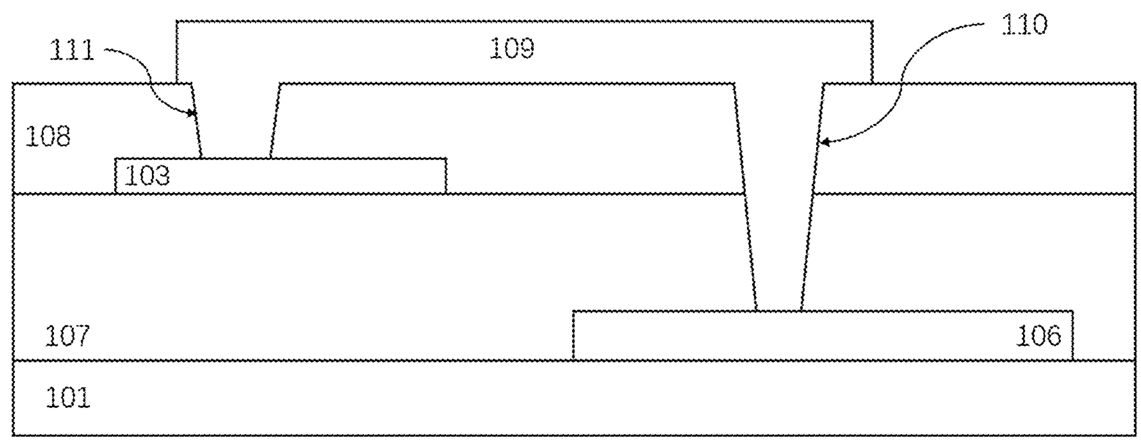
FIG. 3 is a structural diagram of connection of a touch electrode in one embodiment of the invention.

Hereinafter structure principle and working principle of the invention are described in details combining with the accompanying drawings:

FIG. 1 is a structural diagram of a touch display panel in one embodiment of the invention, FIG. 2 is an enlarged diagram of a part of region Q2 in the touch display panel in one embodiment of the invention, and FIG. 3 is a structural diagram of connection of a touch electrode in one embodiment of the invention.

As shown in FIGS. 1 to 3, the touch display panel 100 of the invention comprises a substrate 101 having a display region AA, and a peripheral region BA surrounding the display region AA. Further, the display region AA comprises a regular shape region Q1 and an irregular shape region Q2. As shown in the figures of the invention, taking the irregular shape region Q2 at a position adjacent to the opening region 105 for example, the irregular shape region Q2 also can be located at a corner of the display region AA, or as for the irregular shape display region, the irregular shape region Q2 also can be located at other positions of the display region AA, but the invention is not limited thereto.

In this embodiment, a first touch electrode 102, a second touch electrode 103 and a third touch electrode 104 are located in the irregular shape region Q2. The first touch electrode 102, the second touch electrode 103 and the third touch electrode 104 are arranged adjacently, can be arranged adjacently along a first direction D1 shown in FIGS. 1 and 2, and also can be arranged adjacently along a second direction D2 shown in FIGS. 1 and 2, or arranged adjacently along an inclined direction shown in FIG. 1, and the first direction D1 intersects the second direction D2, but the invention is not limited thereto. In this embodiment, the first direction D1 is vertical to the second direction D2, the first direction D1 is a horizontal direction, and the second direction D2 is a vertical direction. In another embodiment, the first touch electrode 102, the second touch electrode 103 and the third touch electrode 104 also may be located in the regular shape region Q1, but the invention is not limited thereto.

A plurality of first type of touch electrodes (not shown) having an regular shape and arranged in a matrix may be disposed in the regular shape region Q1. The peripheral region BA of the touch display panel 100 is provided with a control element 200, the display region AA of the touch display panel 100 is further provided with a plurality of signal lines (not shown), one end of the plurality of signal lines is connected to the control element 200, and the other end of the plurality of signal lines is correspondingly connected to the plurality of first type of touch electrodes, the first touch electrode 102, the second touch electrode 103 and the third touch electrode 104. In such way, the control element 200 may be electrically connected to the touch electrodes via the signal lines. The control element 200 is a driving chip (IC) or a chip on film (COF).

In one embodiment, a touch electrode layer may be formed in the same process, and may be multiplexed to be a common electrode layer. The touch electrode layer may comprise the plurality of first type of touch electrodes, the first touch electrode 102, the second touch electrode 103 and the third touch electrode 104. In a display phase, the touch electrode layer may act as the common electrode layer, and the control element 200 transmits a corresponding common potential signal to the corresponding touch electrode via the signal lines. In a touch sensing phase, the control element 200 may transmit the corresponding touch signal to the corresponding touch electrode and/or receive a sensing signal of the corresponding touch electrode via the signal lines.

As for the touch display panel 100, the touch electrodes in the touch display panel 100 have an area that shall satisfy a certain design rule, i.e., an area of each touch electrode is greater than or equal to the minimum design area Smin, and less than or equal to the maximum design area Smax. Accordingly, as for the touch display panel 100, in particular, as for the high-frequency operating touch display panel 100, it can be ensured that in the display phase, the touch electrodes may be timely charged and recovered to the common potential in order to ensure display quality, and also can be ensured that in the touch sensing phase, the touch electrodes may precisely make touch sensing. If the area of the touch electrode is less than the minimum design area Smin or greater than the maximum design area Smax, the problems of touch abnormality, insufficient charging of the electrodes when operating at a high frequency, or difference of brightness of the display image in the prior art may occur.

In the invention, in the first touch electrode 102, the second touch electrode 103 and the third touch electrode 104 arranged adjacently, the second touch electrode 103 is electrically connected to the first touch electrode 102, and meanwhile, the second touch electrode 103 and the third touch electrode 104 are electrically disconnected, such that the first touch electrode 102 and the second touch electrode 103 together form a combined touch electrode, and as a part of the combined touch electrode, an area of the first touch electrode 102 and/or the second touch electrode 103 is less than an area of the third touch electrode 104. That is, an area of at least one of the first touch electrode 102 and the second touch electrode 103 is less than an area of the third touch electrode 104.

The touch display panel 100 of the invention makes selectively electrical connection and electrical disconnection of the first touch electrode 102, the second touch electrode 103 and the third touch electrode 104 arranged adjacently to form a combined touch electrode according to actual requirements, and the formed touch electrodes can satisfy the design rule, ensure display quality and avoid touch abnormality.

As shown in FIG. 2, in this embodiment, the third touch electrode 104 is another single electrode unit independent of the combined touch electrode formed of the first touch electrode 102 and the second touch electrode 103. In another embodiment, the third touch electrode 104 also may be a combined touch electrode formed after electrical connection of at least two small electrode units, but the invention is not limited thereto.

In the invention, the first touch electrode 102 has a first area S1, the second touch electrode 103 has a second area S2, the third touch electrode 104 has a third area S3, the first touch electrode 102 and the second touch electrode 103 are electrically connected to form a combined touch electrode, and an area of the combined touch electrode is between the minimum design area Smin and the maximum design area Smax, and conforms to the design rule. The first area S1 and the second area S2 are both less than the maximum design area Smax. The third touch electrode 104 acts as another touch electrode, and the third area S3 also satisfies the design rule, i.e., Smin≤S3≤Smax. In one embodiment, as a part of the combined touch electrode, one of the first area S1 and the second area S2 is less than the minimum design area Smin, i.e., the first area S1 or the second area S2 is less than the minimum design area Smin. In another embodiment, the first area S1 and the second area S2 are both less than the minimum design area Smin. At this time, the first area S1 of the first touch electrode 102 and/or the second area S2 of the second touch electrode 103 are less than the third area S3 of the third touch electrode 104.

In one embodiment, taking the first touch electrode 102 adjacent to the opening region 105 for example (other embodiments are not limited thereto), after the first touch electrode 102 is divided, and the remaining touch electrode layers between the first touch electrode 102 and the opening region 105 act as an integrated touch electrode, an area of the integrated touch electrode is greater than the maximum design area Smax, so the integrated touch electrode shall be split. As for the splitting concept, splitting of the integrated touch electrode itself may be preferably considered. Specifically, the integrated touch electrode is split into several electrically disconnected sub-touch electrodes, and an area of each sub-touch electrode satisfies the design rule. If it is impossible to allow the area of each sub-touch electrode after splitting the integrated touch electrode to satisfy the design rule, comprehensively consideration may be made combining the first touch electrode 102 at a side of the integrated touch electrode (even other touch electrodes at a side of the first touch electrode 102).

Taking comprehensively consideration of the first touch electrode 102 at a side of the integrated touch electrode only for example, specific concept is as follows: (1) determining a difference between the first area S1 of the first touch electrode 102 and the maximum design area Smax; (2) allowing the remaining sub-touch electrodes, in addition to the sub-touch electrode (defined to be the second touch electrode) adjacent to the first touch electrode 102 in the integrated touch electrode to satisfy the design rule (it is unnecessary that the area of each sub-touch electrode must be equal only if it satisfies the design rule), and ensuring that the area of the second touch electrode is less than the difference; (3) electrically connecting the second touch electrode adjacent to the first touch electrode 102 to the first touch electrode 102 to form a combined touch electrode. It shall be noted that the remaining sub-touch electrodes themselves may be a single touch electrode, and also may be a combined touch electrode.

In another embodiment, when the area of the second touch electrode in the item (2) less than a difference between the first area S1 of the first touch electrode 102 and the maximum design area Smax cannot be satisfied only depending on division of the integrated touch electrode between the first touch electrode 102 and the opening region 105, other touch electrodes adjacent to the other side of the first touch electrode 102 may be further comprehensively considered, such that the setting of an area of the second touch electrode in the item (2) less than a difference between the first area S1 of the first touch electrode 102 and the maximum design area Smax is satisfied by adjusting areas of the first touch electrode 102 and adjacent other touch electrodes.

In the embodiments shown in FIGS. 1 and 2, after the first touch electrode 102 is divided and determined, if the remaining touch electrode layers between the first touch electrode 102 and the opening region 105 (which is a whole formed by the second touch electrode 103 and the third touch electrode 104) act as an integrated touch electrode, and an area of the integrated touch electrode is greater than the maximum design area Smax, the integrated touch electrode is split. After splitting, if it is found that the area of each sub-touch electrode satisfying the design rule cannot be satisfied, (1) a difference between the first area S1 of the first touch electrode 102 and the maximum design area Smax is determined; (2) the third area S3 of the third touch electrode 104, in addition to the second touch electrode 103 adjacent to the first touch electrode 102, satisfies the design rule, while ensuring that the second area S2 of the second touch electrode 103 is not greater than the difference; (3) the second touch electrode 103 is electrically connected to the first touch electrode 102 to form a combined touch electrode.

In one embodiment, when an area of the divided touch electrode is less than the minimum design area Smin, the combined touch electrode may be formed by cutting a part of the touch electrode layer adjacent thereto and electrically connecting the divided touch electrode and the touch electrode layer, such that an area of the combined touch electrode satisfies the design rule. For example, when the first area S1 of the divided first touch electrode 102 is less than Smin, a sum of the first area S1 of the first touch electrode 102 and the second area S2 of the second touch electrode 103 after combination satisfies the design rule, i.e., Smin≤(S1+S2)≤Smax, by cutting a part of the touch electrode layer (e.g., the second touch electrode 103) adjacent thereto and electrically connecting the first touch electrode 102 and the second touch electrode 103.

In the invention, when the area of the divided touch electrode is greater than the maximum design area Smax, or less than the minimum design area Smin, other touch electrodes adjacent thereto may be comprehensively considered for electrical connection and electrical disconnection to form a combined touch electrode, and the touch electrodes after splitting all satisfy the design rule, thereby ensuring display quality and avoiding touch abnormality.

In the embodiment shown in FIG. 2, the second touch electrode 103 is a single touch electrode. In another embodiment, the second touch electrode 103 may be further divided into a plurality of electrode units (not shown), and the adjacent two electrode units are electrically disconnected. The first touch electrode 102 is electrically connected to the plurality of electrode units, and the specific dividing number and shape of electrode units can be determined according to shape and area of the first touch electrode 102, but the invention is not limited thereto.

In this embodiment, shapes formed by the first touch electrode 102, the second touch electrode 103 and the third touch electrode 104, or the plurality of electrode units forming the second touch electrode 103 may be irregular shapes, and shape formed by the first touch electrode 102, the second touch electrode 103 and the third touch electrode 104 as a whole is also an irregular shape. The invention makes explanation only taking shape of FIG. 2 for example. Of course, it also can be designed to be other shapes. For example, at least one of the shapes formed by the first touch electrode 102, the second touch electrode 103 and the third touch electrode 104 is an regular shape or an irregular shape, and the shape formed by the first touch electrode 102, the second touch electrode 103 and the third touch electrode 104 as a whole is an regular shape or an irregular shape, but the invention is not limited thereto.

As shown in FIGS. 1 to 3, in the touch display panel 100, a first signal line 106 and a second signal line 116 are disposed on the substrate 101, and the first signal line 106 and the second signal line 116, for example, may be formed of a second metal layer (M2) or a third metal layer (M3).

A first insulating layer 107 is further disposed on the substrate 101, and covers the first signal line 106 and the second signal line 116. The first touch electrode 102, the second touch electrode 103 and the third touch electrode 104 are disposed on the first insulating layer 107. The first touch electrode 102 is electrically connected to the first signal line 106, and the first signal line 106 transmits a corresponding touch signal to the combined touch electrode formed by the first touch electrode 102 and the second touch electrode 103, and/or receives a sensing signal of the combined touch electrode formed by the first touch electrode 102 and the second touch electrode 103. The third touch electrode 104 is electrically connected to the second signal line 116, and the second signal line 116 transmits the corresponding touch signal to the third touch electrode 104 and/or receives a sensing signal of the third touch electrode 104.

Further, the touch display panel 100 further comprises a second insulating layer 108 covered on the touch electrode layer (comprising the first touch electrode 102, the second touch electrode 103 and the third touch electrode 104), and a pixel electrode layer 109 disposed on the second insulating layer 108. In the invention, the touch electrode layer where the first touch electrode 102, the second touch electrode 103 and the third touch electrode 104 are located, for example, may be a first transparent conductive layer (ITO1), and the pixel electrode layer 109, for example, may be a second transparent conductive layer (ITO2), but the invention is not limited thereto.

As shown in FIG. 3, as for the second touch electrode 103, the first insulating layer 107 and the second insulating layer 108 are provided with a first opening 110 exposing a part of the first signal line 106, and the pixel electrode layer 109 extends to the first opening 110 and is electrically connected to the first signal line 106. The second insulating layer 108 is provided with a second opening 111 exposing a part of the second touch electrode 103, and the pixel electrode layer 109 extends to the second opening 111 and is electrically connected to the second touch electrode 103. Accordingly, the second touch electrode 103 and the first touch electrode 102 may be electrically connected together, such that a sum of areas of the first touch electrode 102 and the second touch electrode 103 satisfies the design rule.

In one embodiment, the first touch electrode 102 and the second touch electrode 103 are both electrically connected to the first signal line 106, such that the first touch electrode 102 and the second touch electrode 103 form a combined touch electrode through electrical connection of the first touch electrode 102 and the second touch electrode 103 to the first signal line 106. In another embodiment, the second touch electrode 103 is not connected to the first signal line 106, but electrically connected to the first touch electrode 103 through other layers to form a combined touch electrode. For example, corresponding to the first touch electrode 102 and the second touch electrode 103, the second insulating layer 108 is provided with an opening exposing a part of the first touch electrode 102 and a part of the second touch electrode 103, and the corresponding portion of the pixel electrode layer extends to the opening and is electrically connected to the first touch electrode 102 and the second touch electrode 103.

As for the second touch electrode 103 having a plurality of electrode units, electrical connection with the first touch electrode 102 may be achieved using the same method, and the details are not described here.

The invention further provides a method for manufacturing a touch display panel, and as shown in FIGS. 1 to 3, the manufacturing method of the invention comprises steps of:

S1, providing a substrate 101 having a display region AA.

The display region AA comprises a regular shape region Q1 and an irregular shape region Q2. As shown in the figures of the invention, taking the irregular shape region Q2 adjacent to the opening region 105 for example only, the irregular shape region Q2 also can be located at a corner of the display region AA, or as for the irregular shape display region, the irregular shape region Q2 also can be located at other positions of the display region AA, but the invention is not limited thereto.

A first signal line 106 and a second signal line 116 are formed on the substrate 101, and the first signal line 106 and the second signal line 116, for example, may be formed of a second metal layer (M2) or a third metal layer (M3).

A first insulating layer 107 is formed on the substrate 101, and covers the first signal line 106 and the second signal line 116.

S2, forming a first touch electrode 102, a second touch electrode 103 and a third touch electrode 104 on the first insulating layer 107. The first touch electrode 102, the second touch electrode 103 and the third touch electrode 104 are arranged adjacently, can be arranged adjacently along a horizontal direction shown in the figures, also can be arranged adjacently along a vertical direction shown in the figures, or arranged adjacently along an inclined direction shown in the figures, and the first touch electrode 102, the second touch electrode 103 and the third touch electrode 104, for example, may be a first transparent conductive layer (ITO1), but the invention is not limited thereto.

Next, the second insulating layer 108 is formed, and covers the first touch electrode 102, the second touch electrode 103 and the third touch electrode 104, and then a pixel electrode layer 109 is formed on the second insulating layer 108, and for example, may be a second transparent conductive layer (ITO2), but the invention is not limited thereto.

The first touch electrode 102 is electrically connected to the first signal line 106, and the third touch electrode 104 is electrically connected to the second signal line 116.

As for the second touch electrode 103, in order to achieve electrical connection of the first touch electrode 102 and the second touch electrode 103, the manufacturing method of the invention further comprises:

forming a first opening 110 in the first insulating layer 107 and the second insulating layer 108, the first opening 110 exposing a part of the first signal line 106, and the pixel electrode layer 109 extending to the first opening 110 and electrically connected to the first signal line 106;

forming a second opening 111 in the second insulating layer 108, the second opening 111 exposing a part of the second touch electrode 103, and the pixel electrode layer 109 extending to the second opening 111 and electrically connected to the second touch electrode 103. Accordingly, the second touch electrode 103 and the first touch electrode 102 may be electrically connected together.

According to the embodiments of the invention, each electrically connected touch electrode can satisfy the design rule, and can improve display quality and avoid occurrence of problem of touch abnormality by cutting or electrically connecting the touch electrodes that do not conform to the design rule of area in the local region (such as, the irregular shape region) of the touch display panel.

Of course, the invention may further have various other embodiments, and without departing from spirit and essence of the invention, those skilled in the art may make various corresponding modifications and variations according to the invention, but these corresponding modifications and variations shall belong to the scope of protection of the appended claims of the invention.

What is claimed is:

1. A touch display panel, comprising:

a substrate;

a display region disposed on the substrate;

a first touch electrode disposed in the display region;

a second touch electrode disposed in the display region; and a third touch electrode disposed in the display region, the first touch electrode, the second touch electrode and the third touch electrode arranged adjacently, and the third touch electrode and the second touch electrode electrically disconnected;

the second touch electrode is electrically connected to the first touch electrode, and an area of the third touch electrode is greater than an area of the first touch electrode and/or an area of the second touch electrode; wherein, the first touch electrode has a first area S1, and the second touch electrode has a second area S2, where Smin≤(S1+S2)≤Smax, Smin is the minimum design area of each of the touch electrodes, and Smax is the maximum design area of each of touch electrodes.

2. The touch display panel according to claim 1, wherein the second touch electrode further comprises a plurality of electrode units electrically connected to the first touch electrode, respectively.

3. The touch display panel according to claim 1, wherein the first area S1 is less than Smin, or the second area S2 is less than Smin.

4. The touch display panel according to claim 1, wherein the third touch electrode has a third area S3, where Smin≤S3≤Smax.

5. The touch display panel according to claim 1, wherein the display region comprises a regular shape region and an irregular shape region, and the first touch electrode, the second touch electrode and the third touch electrode are located in the irregular shape region.

6. The touch display panel according to claim 5, wherein the irregular shape region is located at a corner of the display region, or the touch display panel further comprises an opening region adjacent to the irregular shape region.

7. The touch display panel according to claim 1, wherein an overall shape formed by the first touch electrode, the second touch electrode and the third touch electrode is an irregular shape.

8. The touch display panel according to claim 7, wherein at least one of the first touch electrode, the second touch electrode and the third touch electrode has an irregular shape.

9. The touch display panel according to claim 1, wherein the display panel further comprises:

a first signal line and a second signal line disposed on the substrate; and a first insulating layer disposed on the substrate and covering the first signal line and the second signal line, the first touch electrode, the second touch electrode and the third touch electrode disposed on the first insulating layer, the first touch electrode electrically connected to the first signal line, and the third touch electrode electrically connected to the second signal line.

10. The touch display panel according to claim 9, wherein the display panel further comprises:

a second insulating layer disposed on the second touch electrode; and a pixel electrode layer disposed on the second insulating layer; wherein, corresponding to the second touch electrode, the first insulating layer and the second insulating layer are provided with a first opening exposing a part of the first signal line, and the pixel electrode layer extends to the first opening and is electrically connected to the first signal line.

11. The touch display panel according to claim 10, wherein corresponding to the second touch electrode, the second insulating layer is provided with a second opening exposing a part of the second touch electrode, and the pixel electrode layer extends to the second opening and is electrically connected to the second touch electrode.

12. The touch display panel according to claim 9, wherein the display panel further comprises:

a second insulating layer disposed on the second touch electrode; and a pixel electrode layer disposed on the second insulating layer; wherein, corresponding to the first touch electrode and the second touch electrode, the second insulating layer is provided with an opening exposing a part of the first touch electrode and a part of the second touch electrode, and the pixel electrode layer extends to the opening and is electrically connected to the first touch electrode and the second touch electrode.

13. The touch display panel according to claim 1, wherein the third touch electrode is a single electrode unit, or the third touch electrode comprises a plurality of electrode units electrically connected to each other.

14. A method for manufacturing a display panel, comprising:

providing a substrate having a display region; and forming a first touch electrode, a second touch electrode and a third touch electrode in the display region, the first touch electrode, the second touch electrode and the third touch electrode arranged adjacently;

the third touch electrode and the second touch electrode are electrically disconnected, the first touch electrode is electrically connected to the second touch electrode, and an area of the third touch electrode is greater than an area of the first touch electrode and/or an area of the second touch electrode; wherein, the first touch electrode has a first area S1, and the second touch electrode has a second area S2, where Smin≤(S1+S2)≤Smax, Smin is the minimum design area of each of the touch electrodes, and Smax is the maximum design area of each of the touch electrodes.

15. The method according to claim 14, wherein the method further comprises:

the second touch electrode comprising a plurality of electrode units electrically connected to the first touch electrode, respectively.

16. The method according to claim 14, wherein the first area S1 is less than Smin, or the second area S2 is less than Smin.

* * * * *